United States Patent
Ichiyama

[11] Patent Number: 5,879,084
[45] Date of Patent: Mar. 9, 1999

[54] HYDRODYNAMIC BEARING

[75] Inventor: Yoshikazu Ichiyama, Ukyo-ku, Japan

[73] Assignee: Nidec Corporation, Kyoto, Japan

[21] Appl. No.: 854,920

[22] Filed: May 13, 1997

[30]     Foreign Application Priority Data

May 17, 1996 [JP] Japan ................................. 8-147985

[51] Int. Cl.⁶ ...................................................... F16C 17/10
[52] U.S. Cl. ........................... 384/107; 384/112; 384/113
[58] Field of Search .................................... 384/107, 112, 384/113, 114, 120

[56]             References Cited

U.S. PATENT DOCUMENTS 4,805,972  2/1989  Tanaka et al. ........................... 384/107

5,524,728  6/1996  Williams et al. .

FOREIGN PATENT DOCUMENTS 61-152915  10/1986  Japan .

*Primary Examiner*—Lenard A. Footland
*Attorney, Agent, or Firm*—McCormick, Paulding & Huber

[57]             ABSTRACT

A hydrodynamic bearing according to this invention and an electric motor with this hydrodynamic bearing include a shaft having a lubricating-fluid filling hole, one end of which is open toward the outside of the motor and the other end of which leads to the gap between the shaft and a sleeve in which lubricating fluid is filled. At least part of the filling hole except for the opening facing the outside of the motor has a smaller diameter than that of the outer opening. An elastic member formed of elastic material is inserted into the lubricating fluid fillng hole.

21 Claims, 5 Drawing Sheets

HYDRODYNAMIC BEARING

BACKGROUND OF THE INVENTION

The present invention relates to a hydrodynamic bearing, a method for filling the hydrodynamic bearing with lubricating fluid, and a motor using the hydrodynamic bearing, for example, an electric motor that drives a recording medium such as a hard disc.

In a hydrodynamic bearing, a fluid with a predetermined viscosity used for bearings is placed in the gap between a shaft and a sleeve instead of a conventional bearing means such as a ball bearing. When the shaft and the sleeve rotate with respect to each other, herringbone or spiral groove formed in each of the radial and thrust bearing portions of the shaft and/or the sleeve acts to generate dynamic pressure in the fluid in the gap in order to support a rotor. A taper seal is formed near the open end of the gap between the shaft and the sleeve to hold the fluid in the gap by surface tension or capillary action of the fluid. Due to the lack of an operating surface that is directly contacted during the rotation of a motor, the hydrodynamic bearing offers advantages of quietness during rotation and stability.

Figure 5:
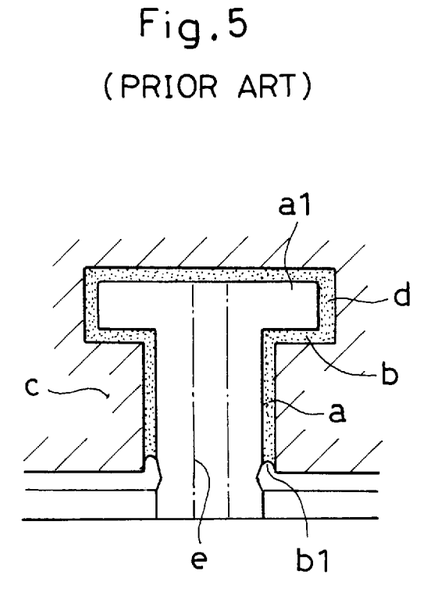
FIG. 5 is an enlarged view of a hydrodynamic bearing section of a conventional hydrodynamic bearing.

FIG. 5 shows one example of a conventional hydrodynamic bearing wherein a sleeve (c) is coaxially supported by a shaft (a) via a gap (b) which is open at one end (b1) and filled with lubricating oil (d). The shaft (a) has a thrust plate (a1) which is fixed to or integrally formed with the shaft (a). In a conventional art, to fill the gap (b) with lubricating oil (d), in such a hydrodynamic bearing, the lubricating oil (d) is disposed near the end (b1) under a vacuum, then the atmospheric pressure is recovered, and the oil (d) is pushed into the gap (b) under the atmospheric pressure, or the oil (d) is filed through a fling hole (e) formed in the shaft (a) so as to allow the oil(d) to enter the gap (b) under the surface tension of the oil(d).

When the above method is used to fill the lubricating oil (d), however, the lubricating oil (d) may be deposited on the taper seal formed in the vicinity of the outer opening portion b1 or on an oil repellent material coated near the outer opening portion b1, resulting in a degraded seal function. In addition, in an initial state before the filling of the lubricating oil, the clearance of the gap (b) is not uniform and the filling pressure and surface tension of the lubricating oil (d) reaches equilibrium, so the lubricating oil (d) may not spread to the desired portions of the gap (b) or bubbles may appear in the lubricating oil (d). This has been the problem to be solved in manufacturing hydrodynamic bearings.

SUMMARY OF THE INVENTION

It is an object of this invention to provide a hydrodynamic bearing with which a desired amount of lubricating oil is filled into desired portions without causing the above mentioned problems.

It is another object of this invention to provide a method for filling a desired amount of lubricating oil into desired portions of a hydrodynamic bearing without causing the above problems.

It is yet another object of this invention to provide a motor with a hydrodynamic bearing that has a structure that allows a desired amount of lubricating oil to be filled into desired portions.

It is still another object of this invention to provide a hydrodynamic bearing with a structure that enables easy and efficient operation for filling lubricating oil.

It is still another object of this invention to provide a hydrodynamic bearing with a structure that enables the sealing of oil filled section after it is filled with lubricating oil.

A hydrodynamic bearing according to this invention and an electric motor with this hydrodynamic bearing include a shaft having a lubricating-fluid filling hole, one end of which is open toward the outside of the motor and the other end of which leads to the gap between the shaft and a sleeve in which lubricating fluid is filled. At least part of the filling hole except for the opening facing the outside of the motor has a smaller diameter than that of the outer opening. An elastic member formed of elastic material is inserted into the lubricating fluid filling hole.

According to the hydrodynamic bearing of this invention and the electric motor with the hydrodynamic bearing, an elastic member having a portion with a larger diameter than the small-diameter portion of the lubricating-fluid filling hole is inserted into the lubricating-fluid filling hole, a hollow needle is allowed to penetrate the elastic member to inject a lubricating fluid into the hole, and after a desired amount of lubricating oil has been injected, the hollow needle is removed from the elastic member, which is then press-fitted in the small-diameter portion inside the lubricating-fluid filling hole. Thus, the elastic member is deformed under pressure to close the hole of elastic member as the trace of the needle penetration, thereby sealing the filling hole relatively easily and reliably, whereby the productivity of the hydrodynamic bearings is improved.

The lubricating-fluid filling hole may not include the small-diameter portion. In that case, the elastic member may have a larger diameter than the opening of the lubricating-fluid filling hole such that the elastic member is elastically deformed to seal the filling hole, thereby producing similar effects.

In addition, according a hydrodynamic bearing of the present invention, a hydrodynamic bearing includes a shaft having a lubricating-fluid filling hole, one end of which is open toward the outside of the bearing and the other end of which leads to a gap between the shaft and the sleeve in which lubricating fluid is filled. At least part of the filling hole except for the opening facing the outside of the motor has a smaller diameter than that of the outer opening. The lubricating-fluid filling hole sealing means includes an elastic member formed of an elastic material and which is inserted into the lubricating-fluid filling hole, the elastic member having a portion with a larger diameter than that of the small-diameter portion of the lubricating-fluid filling hole. According to the method of filling lubricating fluid of the present invention, the elastic member is inserted into the lubricating-fluid filling hole, a hollow needle is penetrated through the elastic member to inject lubricating fluid, and after injection has been completed, the hollow needle is removed from the elastic member, which is then pushed inwardly to be press-fitted in the small-diameter portion inside the lubricating-fluid filling hole. Thus, the elastic member is deformed under pressure to close the hole as a trace of the needle penetration, thereby sealing the filling hole relatively easily and reliably, whereby the productivity of hydrodynamic bearings is improved.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
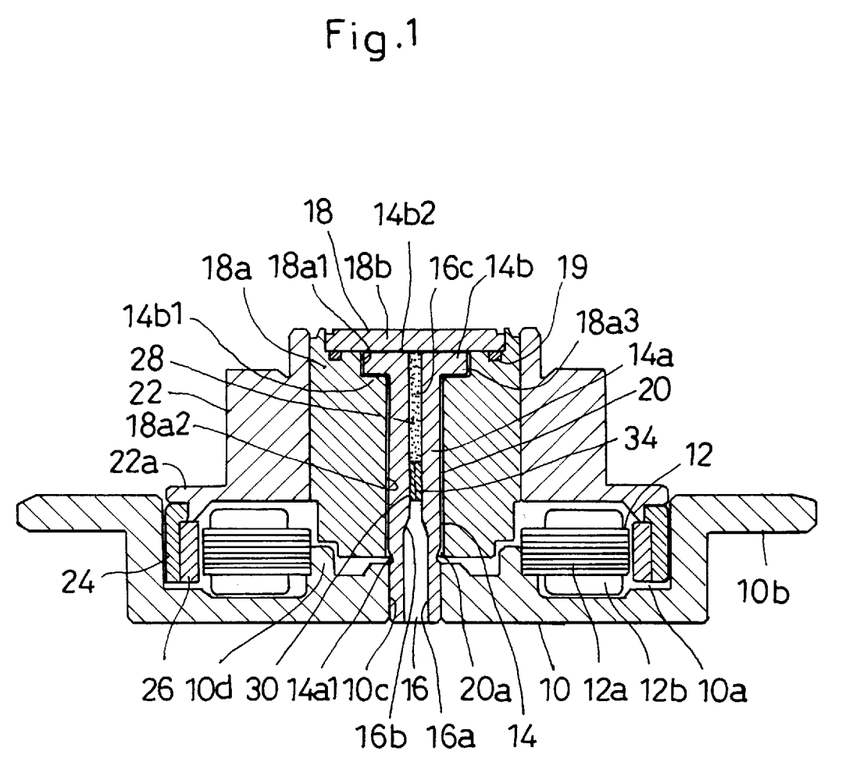
FIG. 1 is a cross-sectional view of an electric motor for driving a recording-medium and, in which one embodiment of a hydrodynamic bearing according to the present invention is incorporated.

With reference to FIG. 1, explanation will be made about an embodiment in which a hydrodynamic bearing according to this invention is incorporated in an electric motor used to drive a recording medium (e.g. a hard disc).

A bracket 10 generally of a basin shape includes an outwardly extending flange portion 10b extending from the upper end of the annular recess 10a; and a through hole 10c at the central portion of the bottom of the annular recess 10a. An annular protrusion 10d protruding axially inwardly relative to a motor is formed outside the through hole 10c. A stator 12 having a stator core 12a and a stator coil 12b wound therearound is fixed to the protrusion 10d and accommodated in the annular recess 10a.

A shaft member 14 includes a cylindrical shaft 14a and a disc-like thrust plate 14b integrally formed with or coaxially fixed to the upper end of the shaft 14a. The shaft 14a has its lower end fixed in the through hole 10c to be disposed coaxially with the annular recess 10a. A lubricating-fluid filling hole 16 having a circular cross section and extending through the shaft member 14 along its axis comprises a large-diameter portion 16a located at the bottom, a tapered portion 16b with an upwardly decreasing diameter, and a small-diameter portion 16c located above the tapered portion 16b.

A sleeve member 18 comprises a substantially cylindrical sleeve 18a having a large inner-diameter portion 18a1 at the upper end and a small inner-diameter portion 18a2 located below the portion 18a1; and a disc-like thrust cap 18b fixed in the large-diameter portion 18a1. An O ring 19 for tightly sealing the thrust cap 18b and the sleeve 18a is mounted between the bottom surface of the thrust cap 18b and the sleeve 18a.

The sleeve member 18 is fitted outside the shaft member 14 so as to be coaxial therewith via a gap 20 which is annularly open only at its lower end 20a. A radial bearing portion is composed of a small-diameter portion 18a2 of the sleeve 18a; the shaft 14a fitted inside the small diameter portion 18a2 with the gap 20 remaining therebetween; and lubricating oil 28 (an example of the lubricating fluid) that is filled in the gap 20. A thrust bearing portion is composed of a shoulder portion 18a3 located between the large-diameter portion 18a1 and the small-diameter portion 18a2; an annular bottom surface 14b1 of the thrust plate 14b opposing to the shoulder 18a3 with the gap 20 remaining therebetween; an annular top surface 14b2 of the thrust plate 14b; the bottom surface of the thrust cap 18b opposing to the annular top surface 14b2 with the gap 20 remaining therebetween; and the lubricating oil 28 filling the gap 20. Each thrust and radial bearing portions of the shaft member 14 and the sleeve member 18 includes a groove (for example, a herringbone or a spiral groove) for generating stable, high dynamic pressure in the lubricating oil 28 in the gap 20. A circular groove is formed on the lower portion of the outer circumference which corresponds to the inner circumference of the lower end of the sleeve member 18 to form a taper seal section 14a1 with a downwardly decreasing diameter.

The shaft 14a is formed to reduce its diameter downwardly to the circular groove to form a taper seal section 14a1 together with the inner surface of the sleeve member 18.

A generally cylindrical rotor hub 22 is fixed to the outer circumference of the sleeve 18a. The upper end of a cylindrical rotor yoke 24 is fixed to an outwardly protruding portion 22a formed at the lower end of the rotor hub 22, and a rotor magnet 26 is fixed to the inner circumferential surface of the rotor yoke 24 so as to oppose the stator 12.

According to the hydrodynamic bearing of this invention, the lubricating oil 28 can be filled in the gap 20 as described below to complete the hydrodynamic bearing.

FIGS. 2(a) to (d) sequentially describe the process for filling lubricating fluid in the hydrodynamic bearing according to the present invention. First, an elastic member with a rubber-like elasticity (its lower end has the specified large outer diameter, its middle portion is tapered in such a way that the diameter decreases inwardly, and its top has the specified small outer diameter. In each portion, the outer diameter of the elastic member 30 has a somewhat larger outer diameter than the inner diameter of the lubricating-fluid filling hole) is inserted into the lubricating-fluid filling hole 16. In this case, the large outer-diameter portion, the tapered portion with a decreasing diameter, and the small outer-diameter portion of the elastic member 30 are inserted into and contact with the large-diameter portion 16a, tapered portion 16b, and small-diameter portion 16c of the lubricating-fluid filling hole 16, respectively. It must be inserted in such a way that the lubricating fluid used will not leak between the elastic member 30 and the lubricating-fluid filling hole 16.

The elastic member 30 may be formed of synthetic or natural rubber, may be of such material coated with synthetic resin, and must be sufficiently durable against the lubricating fluid used.

Figure 2A:
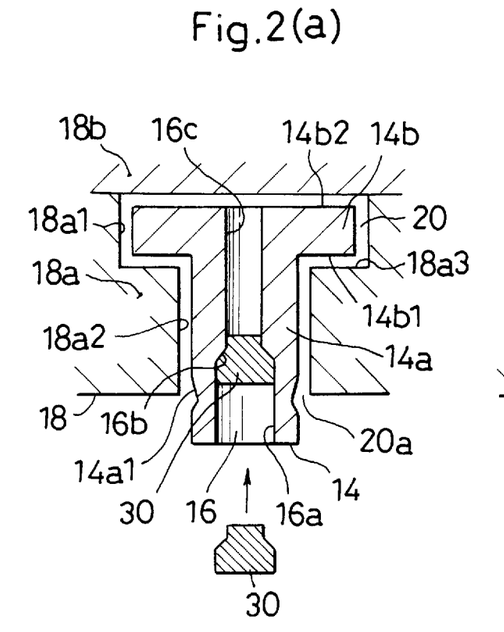
FIGS. 2(a) to (d) are partly enlarged views of a hydrodynamic bearing showing the process for filling lubricating fluid in the hydrodynamic bearing according to this invention.
Figure 2B:
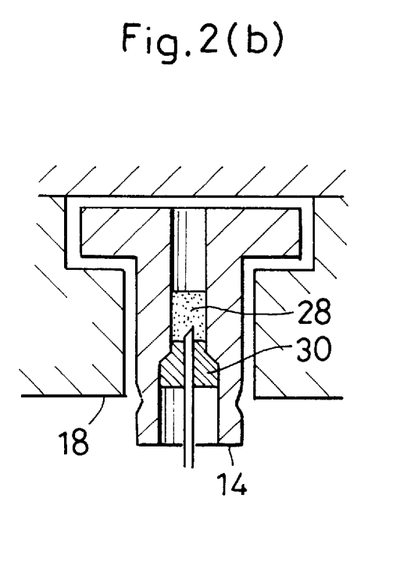
Figure 2C:
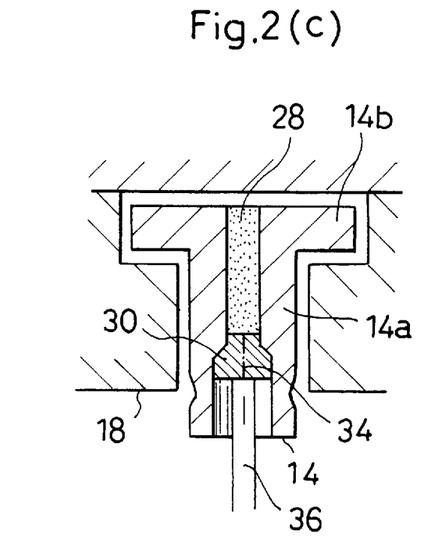

The motor is then placed in, for example, a vacuum chamber, and the air present in the motor is exhausted. As shown in FIG. 2(b), a hollow needle 32 (for example, an injection needle) is inserted into the elastic member 30 to penetrate therethrough from the outside to the inside of the motor (the hollow needle 32 may be inserted before the elastic member 30 is fitted into the lubricating-fluid filling hole 16). A specified amount of lubricating oil 28 is filled in the lubricating-fluid filling hole 16 on the inner side of the elastic member 30 and the lubricating oil 28 is retained in the filling hole 16 as shown in FIG. 2(c). The hollow needle 32 is then removed from the elastic member 30 with a hole as trace of a needle penetration leaving in the elastic member 30.

Figure 2D:
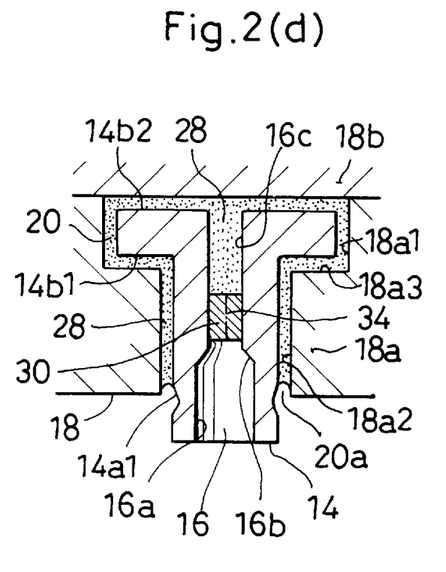

The elastic member is pushed inwardly (to the upward direction in FIG. (2) using a force bar 36, as shown in FIG. 2(c)) until the large-diameter portion of the elastic member 30 is press-fitted in the small diameter portion 16c of the lubricating-fluid filling hole 16 in an airtight manner as shown in FIG. 2(d). To press-fit the elastic member 30 smoothly, at least part of the elastic member 30 or part of the lubricating-fluid filing hole 16 may be tapered.

Thus, the lubricating-fluid filling hole 16 is sealed by the elastic member 30 with at least part of the hole 34 as the trace of the needle penetration being effectively closed. Even if the trace 34 of the needle penetration is not completely closed before press fitting, the press fitting causes the elastic member 30 to be compressed by the inner circumferential surface of the small-diameter portion 16c of the lubricating-fluid filling hole 16, thereby ensuring at least partial closure of the hole 34. If a part or all of the trace 34 of the needle penetration has been effectively closed before press fitting, the compression caused by the press fitting ensures firmer closure.

Thus, by press fitting the elastic member 30, part of the lubricating oil 28 deposited in the lubricating-fluid filling hole 16 on the inner side of the elastic member 30 (the upper side in the figure) can be simultaneously pushed out from the opening at the upper end of the lubricating-fluid filling hole 16 and filled throughout the gap 20. The lubricating oil 28 continuously spreads through the gap 20 and the portion of the lubricating-fluid filling hole 16 above the inner surface of the elastic member 30. The lubricating oil 28 at the annular opening located at the lower end of the gap 20 is retained by capillarity or the surface tension of the lubricating fluid 28 in the gap 20 at the taper seal section 14a1, where the gap is radially enlarged.

In this manner, a hydrodynamic bearing is completed in which the sleeve member 18 is rotatably supported by the shaft member 14 via the lubricating oil 28 in the gap 20.

Figure 3A:
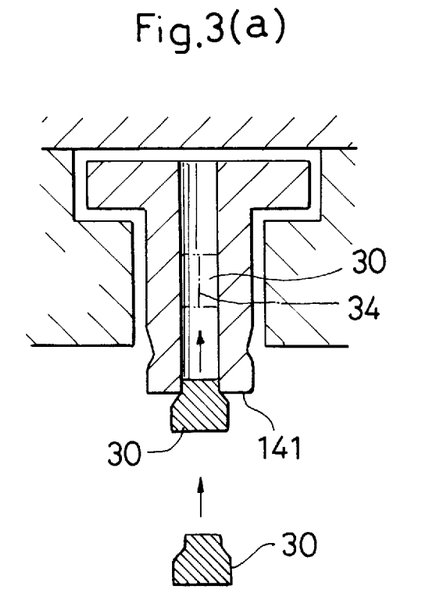
FIG. 3(a) is a partly enlarged view of a hydrodynamic bearing showing a method for filling a lubricating fluid in the hydrodynamic bearing according to this invention, wherein the bearing includes a lubricating-fluid filling hole without a small-diameter portion.
Figure 3B:
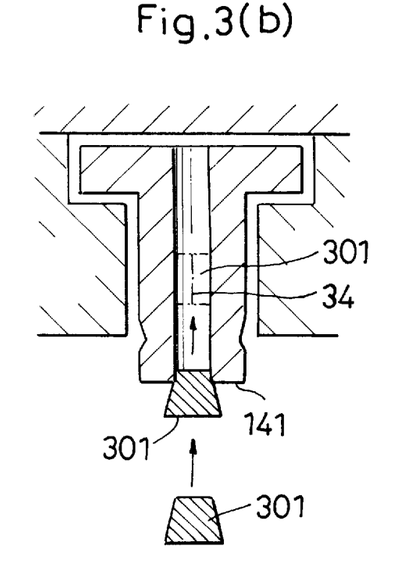
FIG. 3(b) is a partly enlarged view of a hydrodynamic bearing showing a method for filling a lubricating fluid in the hydrodynamic bearing according to this invention, wherein the bearing includes the lubricating-fluid filling hole without a small-diameter portion and an elastic member with a different shape.
Figure 3C:
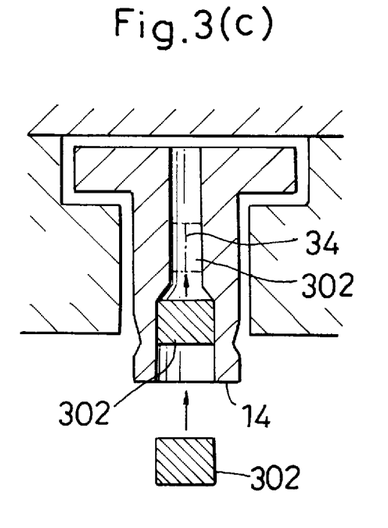
FIG. 3(c) is a partly enlarged view of a hydrodynamic bearing showing a method for filling a lubricating fluid in the hydrodynamic bearing according to this invention, whereby the bearing includes an elastic member with a different shape.

As shown in FIGS. 3(a) and (b), effects similar to those of the specific example as shown in FIG. 2 can be obtained by using a lubricating-fluid fillng hole 16 without a small-diameter portion. The elastic member 30 may be shaped like a truncated cone 301 as shown in FIG. 3(b) (the overall elastic member except for its upper end has a large diameter) or a cylinder 302 as shown in FIG. 3(c), or may have a lower specified large-diameter portion and an upper tapered portion with a decreasing diameter (not shown).

If the gap between the shaft member and the sleeve member and the portion of the lubricating-fluid filling hole above the elastic member are not under a vacuum, the steps subsequent to the injection of the lubricating fluid should be carried out with the inner side of the lubricating-fluid filling hole being positioned above the elastic member in order to prevent bubbles from appearing in the lubricating fluid.

In order that a desired amount of lubricating fluid is pushed by the elastic member 30 to and filled in the desired portion of the gap 20 without fail, it is preferable to regulate the amount of insertion of the elastic member 30 at the time of lubricating fluid injection, the amount of the lubricating fluid to be injected, and the amount of movement of the force bar for pushing the elastic member 30 inwardly.

FIG. 4 shows another embodiment of the hydrodynamic bearing according to the present invention. A shaft member 50 comprises a cylindrical shaft 50a; and thrust plates 50b respectively fixed to the upper and lower portions of the shaft 50a. An annular recess 50a1 extending around the outer circumference of the shaft 50a is formed on the outer circumference of a shaft 50a at an axially middle portion thereof.

A lubricating-fluid filling hole 52 with a circular cross section is formed along the axis of the shaft member 50. One end of the lubricating-fluid filling hole 52 (the lower end in FIG. 4) is open, while a sealing member 54 of synthetic resin or rubber is fitted on the other end of the hole 52 to seal it. The lubricating-fluid filling hole 52 comprises a lower large-diameter portion 52a; a tapered portion 52b positioned below the annular recess 50a1 and having an upwardly decreasing diameter; and a small-diameter portion 52c positioned above the tapered portion 52b. The lubricating-fluid filling hole 52 may be a hole with only one end opened instead of a through hole with one end sealed as in the illustrated embodiment.

A communicating hole 56 is formed between the lubricating-fluid filing hole 52 and the annular recess 50a1. The hole 56 extends in the radial direction of the shaft member 50.

A sleeve member 58 includes a substantially cylindrical sleeve 58a having a large inner-diameter portions 58a1 formed on inner circumferential portions at both ends (the upper and lower ends in FIG. 4), intermediate inner-diameter portions 58a2 formed inside the large inner-diameter portions 58a1, and a small inner-diameter portion 58a3 formed inside of both intermediate inner-diameter portions 58a2; and disc-like thrust bushes 58b fixedly fitted to the inner circumferential surface of both large innerdiameter portions 58a1.

The sleeve member 58 is coaxially fitted on the shaft member 50 with a gap 60 remaining therebetween. A sleeve 58a includes a small inner diameter portion 58a3 opposing to the outer circumferential surface of the shaft 50a with a gap 60 remaining between the portion 58a3 and the surface of the shaft 50a; and an intermediate inner-diameter portion 58a2 opposing to the outer circumferential surface of the thrust plate 50b with a gap 60 remaining between the portion 58a2 and the outer surface of the thrust plate 50b. An annular end surface 58a4 between the intermediate inner-diameter portion 58a2 and the small inner-diameter portion 58a3 opposes an annular inner surface 50b1 of the thrust plate 50b with a gap remaining between the surfaces. An annular outer surface 50b2 of the thrust plate 50b opposes the thrust bush 58b with a gap 60 remaining between the surface 50b2 and the thrust bush 58b. A groove (for example, a herringbone or a spiral groove) is formed on both or either of the shaft member 50 (including thrust plate 50b) and sleeve member 60 at each of the thrust and radial bearing portions to generate a stable, high dynamic pressure in the lubricating-fluid filled in the gap 60. Both annular end surfaces 58a4 are in communication with each other through their outer circumferential portions via a through hole 58a5. The annular outer surfaces 50b2 of both thrust plate 50b have a tapered sealing section with a depth that increases toward the shaft 50a.

A hydrodynamic bearing according to another embodiment of this invention enables a hydrodynamic bearing to be completed by, for example, filling a lubricating fluid 63 in the gap 60 as described below.

Figure 4A:
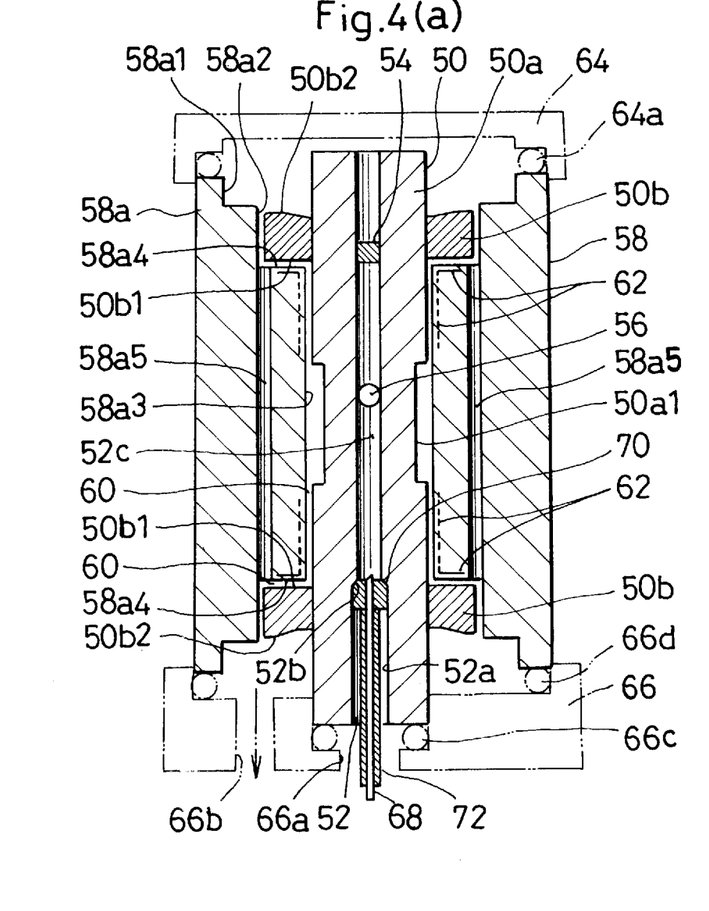
FIG. 4 is a partly enlarged view of a hydrodynamic bearing showing another embodiment of the hydrodynamic bearing according to this invention.

A disc-like cap 64 and an annular cap 66 shown by the two-dot chain line in FIG. 4(a) are installed at the upper and lower ends of the sleeve 58a to seal the motor, except for a central opening 66a and an exhaust hole 66b. Within the disc-like cap 64 is positioned an O ring 64a that acts as a seal between the cap 64 and the outer circumference of the upper end of the sleeve 58a, and within the annular cap 66 is positioned O rings 66c, 66d that act as seals between the lower end surface of the shaft member 50 and the lower end of the sleeve 58a. The disc-like cap 64 and annular cap 66 may be installed at any time before lubricating fluid 63 is filled as described below.

An elastic member 70 has a specified large diameter at its lower portion, and its upper portion is tapered in such a way that the diameter decreases toward its top. The elastic member 70 may be made of a material similar to that of the embodiment shown in FIG. 2. The elastic member 70 has a rubber-like elasticity, such that it is penetrated by a hollow needle 68 from the outside to the inside of the motor, and is inserted and fitted in the lubricating fluid filling hole 52 in such a way that the tapered portion of the elastic member 70 fits the tapered portion 52b. In this case, by fitting a force bar 72 of a hollow cylinder around the hollow needle 68 outside the elastic member 70, the elastic member 70 can be inserted easily by the force bar 72.

Then, the air in the lubricating-fluid filling hole 52 and the gap 60 is exhausted by suction through the exhaust hole 66b to vacuumize the inside of the motor. A specified amount of lubricating fluid 63 is then injected through the hollow needle 68 which passes through the elastic member 70 placed in the lubricating-fluid filling hole 52 to deposit the fluid in the filling hole 52 and in the gap 60 near the through hole 58b5.

Figure 4B:
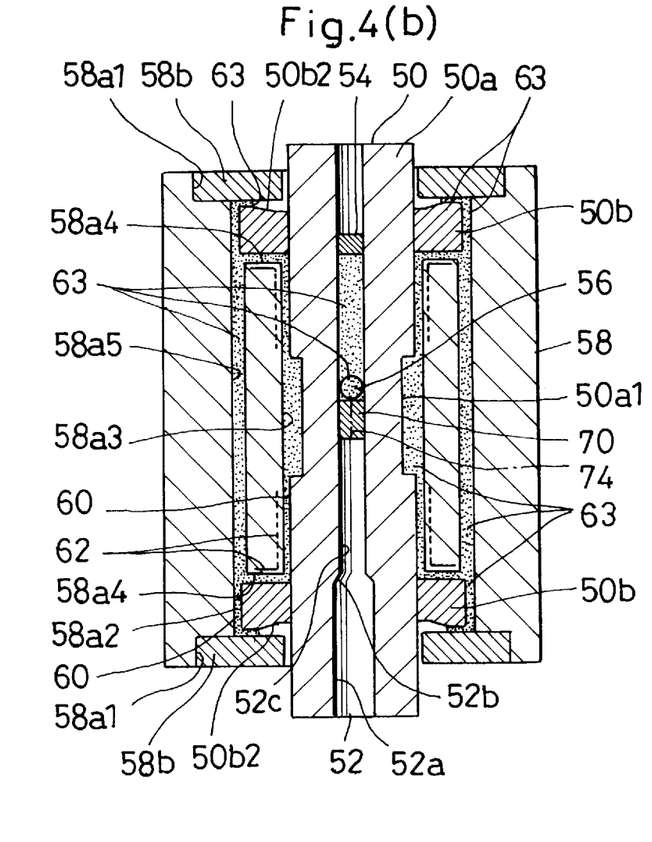

Then, the disc-like cap 64 and the annular cap 66 are removed and the thrust bushes 58bs are fitted in the inner circumference of both large inner-diameter portions 58a1 and fixed by means of caulking. The elastic member 70 is then pushed inwardly (the upward direction in FIG. 4) by the force bar 72, while the hollow needle 68 is removed outwardly from the elastic member 70. The large-diameter portion of the elastic member 70 is press-fitted in the small inner-diameter portion 52c of the lubricating-fluid filling hole 52 in an airtight manner, as shown in FIG. 4(b).

Thus, the lubricating-fluid filling hole 52 can be sealed by the elastic member 70 with at least part of the trace hole of a needle penetration 74 being effectively closed.

The elastic member 70 is further pushed inwardly by the force bar 72 to fill the lubricating fluid 63 in the gap between the thrust plate 50b and the thrust bush 58b to complete a hydrodynamic bearing in which the sleeve member 58 is rotatably supported by the shaft member 50 via the lubricating fluid 63 in the gap 60.

Since both of the annular end surfaces 58a4 are in communication with each other through the through hole 58a5 in their outer circumferential portions, both thrust bearing portions are well balanced. The lubricating fluid 63 residing between the thrust plate 50b and the thrust bush 58b and opens to the outside through the gap between the shaft 50a and the thrust bush 58b is retained in the gap 60 by capillarity or the surface tension of the lubricating fluid 63 in the taper seal section formed by the inner surface of the thrust bush 58b and the annular inclined outer surface 50b2 of the thrust plate 50b.

After removing the disc-like cap 64 and the annular cap 66, the lubricating fluid 63 may be filled on the annular outer surfaces 50b2 of both thrust plate 50b, the thrust bushes 58b may then be fitted in the inner circumference of both large inner-diameter portions 58a1 of the sleeve 58a and fixed by means of caulking, and the thrust plate 50b and the thrust bush 58b may then be relatively rotated by the relative rotation of the sleeve member 58 and the shaft member 50 to bias the lubricating fluid 63 toward the outer circumference by the centrifugal force in order to hold the fluid in the taper seal section, thereby similarly completing a hydrodynamic bearing.

In this manner, by press fitting the elastic member 70, portion of the lubricating fluid 63 deposited in the hole 52 on the inner side of the elastic member 70 (the upper side in the figure) is simultaneously pushed out through the communicating hole 56 and filled throughout the gap 60. The lubricating fluid 63 spreads continuously through the gap 60, and the lubricating fluid filling hole on inner side of the elastic member 70.

Although, in the above description, the shaft member is fixed while the sleeve member is rotated, this invention can be applied to a bearing and motor in which the sleeve member is fixed while the shaft member is rotated.

According to the hydrodynamic bearing of this invention, an elastic member with a rubber-like elasticity is fitted in a lubricating-fluid filling hole, lubricating fluid is injected into the lubricating-fluid filling hole through a hollow needle which penetrates the elastic member from the outside to the inside of the bearing, and then the hollow needle is removed from the elastic member, which in turn is pushed inward to press-fit and the elastic member with trace of needle penetration being closed by the small-diameter portion, whereby the lubricating fluid can be easily and reliably filled in desired positions of the gap between the shaft member and the sleeve member, while the lubricating-fluid filling hole can be simultaneously sealed by the elastic member, thereby enabling efficient manufacture of high quality hydrodynamic bearings.

In addition, by carrying out the step for injecting the lubricating fluid in the lubricating-fluid filling hole and subsequent steps under the condition at least an inner portion of the filling hole, and the gap are under a vacuum, generation of bubbles in the lubricating fluid can be prevented and filling of the lubricating oil in desired portions of the gap is ensured by the extrusion of the elastic member.

The terms and expressions which have been employed in the foregoing specification are used therein as terms of description and not as terms of limitation, and there is no intention, in the use of such terms and expressions, of excluding the equivalents of the features shown and described or the portions thereof, it being recognized that the scope of the invention is defined and limited only by the claims which follow.

What is claimed is:

1. A hydrodynamic bearing device comprising:
   a sleeve having an inner bearing surface;
   a shaft having an outer bearing surface and fitted in and supported by the sleeve for relative rotation with the inner and outer bearing surfaces opposing each other leaving a bearing gap therebetween;
   a communicating hole extending within the shaft, the communicating hole communicating the exterior of the bearing with the bearing gap;
   a bearing liquid filled in the bearing gap, at least one of the inner and outer bearing surface being provided with at least one bearing groove for generating a hydrodynamic pressure in the bearing liquid during the relative rotation of the shaft and the sleeve; and
   an elastic member inserted in the communicating hole to seal the hole.

2. A hydrodynamic bearing device of claim 1, wherein the communicating hole has a large diameter portion in the exterior side of the bearing, a small diameter portion in the interior side of the bearing, and a tapered portion between the large and small diameter portions.

3. A hydrodynamic bearing device of claim 1, wherein the elastic member is made of a material and size through which a hollow needle is pierced at its first portion in the communicating hole and which closes the trace of the needle piercing at its second portion in the communicating hole.

4. A hydrodynamic bearing device of claim 1, wherein the elastic member includes a first portion having a diameter slightly larger than the large diameter portion of the communicating hole, a second portion having a diameter slightly larger than the small diameter portion of the communicating hole and a tapered portion formed between the first and second portions, the elastic member seals the communicating hole with the whole portion of the elastic member being pushed into the tapered portion of the communicating hole.

5. A hydrodynamic bearing device of claim 1, wherein the communicating hole includes an axial passage extending within the shaft and opening at an axially outer end portion of the shaft, and a radial passage connecting the axial passage with the bearing gap.

6. A hydrodynamic bearing device of claim 5, wherein the axial passage has a large diameter portion in the exterior side of the bearing device and a small diameter portion in the interior side of the bearing device, and a tapered portion between the large and small diameter portions.

7. A hydrodynamic bearing device of claim 5, wherein the axial passage communicates with the bearing gap at the central portion of the shaft, the axial passage is sealed by the elastic member in the vicinity of the opening portion of the radial passage and at the interior side portion of the bearing device.

8. A hydrodynamic bearing device of claim 5, wherein the elastic member includes a first portion having a diameter slightly larger than the large diameter portion of the axial passage, a second portion having a diameter slightly larger than the small diameter portion of the axial passage and a tapered portion formed between the first and second portions.

9. An electric motor comprising:
   a sleeve having an inner bearing surface;
   a shaft having an outer bearing surface and fitted in and supported by the sleeve for relative rotation, with the inner and outer bearing surfaces opposing each other leaving a bearing gap therebetween;
   a communicating hole extending within the shaft, the communicating hole communicating the exterior of the bearing with the bearing gap;
   a bearing liquid filled in the gap, at least one of the inner and outer bearing surface being provided with at least one bearing groove for generating a hydrodynamic pressure in the bearing liquid during the relative rotation of the shaft: and the sleeve; and
   a hub fixed to the sleeve;
   a rotor magnet fixed on the hub;
   a stator disposed to oppose the rotor magnet;
   an elastic member inserted into the communicating hole to seal the hole.

10. An electric motor of claim 9, wherein the communicating hole has a large diameter portion in the exterior side of the bearing and a small diameter portion in the interior side of the bearing, and a tapered portion between the large and small diameter portions.

11. An electric motor of claim 9, wherein the elastic member is made of a material and size through which a hollow needle is pierced at its first portion in the communicating hole and which closes the trace of the needle piercing at its second portion in the communicating hole.

12. An electric motor of claim 9, wherein the elastic member includes a first portion having a diameter slightly larger than the large diameter portion of the communicating hole, a second portion having a diameter slightly larger than the small diameter portion of the communicating hole and a tapered portion formed between the first and second portions, the elastic member seals the communicating hole with the whole portion of the elastic member being pushed into the tapered portion of the communicating hole.

13. An electric motor of claim 9, wherein the elastic member includes a first portion having a diameter slightly larger than the large diameter portion of the communicating hole, a second portion having a diameter slightly larger than the small diameter portion of the communicating hole and a tapered portion formed between the first and second portions, the elastic member seals the communicating hole with the whole portion of the elastic member being pushed into the tapered portion of the communicating hole.

14. A hydrodynamic bearing device comprising;
   a shaft;
   a sleeve disposed for relatively rotating with the shaft, the shaft and sleeve cooperating to form a bearing gap between the outer surface of the shaft and inner surface of the sleeve;
   a bearing liquid filled in the bearing gap;
   a communicating hole extending within the shaft, the communicating hole communicating the exterior of the bearing with the bearing gap;
   means for causing dynamic pressure in the bearing liquid during the relative rotation of the shaft and the sleeve in order to support the shaft and the sleeve;
   means for allowing injection of the bearing liquid into the bearing gap through the communicating hole; and
   means for sealing the communicating hole after the injection of the bearing liquid.

15. A hydrodynamic bearing device of claim 14, wherein the communicating hole has a large diameter portion in the exterior side of the bearing and a small diameter portion in the interior side of the bearing, and a tapered portion between the large and small diameter portions.

16. A hydrodynamic bearing device of claim 14, wherein the hydrodynamic pressure generating means is at least one bearing groove formed at least one of the inner and outer bearing surface.

17. A hydrodynamic bearing device of claim 14, wherein the bearing liquid injection allowing means includes the elastic member through which a hollow needle pierces such that the bearing liquid is injected into the communicating hole through the needle, the communicating hole once stores the bearing liquid above the tapered portion of the communicating hole, the elastic member is pushed into the small diameter portion of the communicating hole via the tapered portion and the bearing liquid is pushed into the bearing gap under the pressure of the press insertion of the elastic member.

18. A hydrodynamic bearing device of claim 17, wherein the elastic member for sealing the communicating hole includes a first portion having a diameter slightly larger than the large diameter portion of the communicating hole, a second portion having a diameter slightly larger than the small diameter portion of the communicating hole and a tapered portion formed between the first and second portions, the elastic member seals the communicating hole with the whole portion of the elastic member being pushed into the tapered portion of the communicating hole.

19. A hydrodynamic bearing device of claim 17, wherein the elastic member for sealing the communicating hole includes a first portion having a diameter slightly larger than the large diameter portion of the communicating hole, a second portion having a diameter slightly larger than the small diameter portion of the communicating hole and a tapered portion formed between the first and second portions, the elastic member seals the communicating hole with the whole portion of the elastic member being pushed into the tapered portion of the communicating hole.

20. A hydrodynamic bearing device for the motor including a shaft, a sleeve disposed for rotation relative to the shaft, the shaft and sleeve being fitted with each other to form a bearing gap between the outer surface of the shaft and inner surface of the sleeve, a bearing liquid filled in the bearing gap, a communicating hole extending within the shaft, the communicating hole having a large diameter portion in the exterior side of the bearing, a small diameter portion in the interior side of the bearing a tapered portion between the large and small diameter portions, and the communicating hole communicating the exterior of the bearing with the bearing gap, wherein the bearing liquid is filled in the bearing gap by a process comprising the steps of placing an elastic member at a first position of a communicating hole, piercing a needle through the elastic member, injecting a bearing liquid into the communicating hole through the needle, pulling the needle out of the elastic member and pushing the elastic member into a second position of the communicating hole for press fitting the elastic member in the hole to close a vestige of the piercing needle of the elastic member by the deformation of the elastic member.

21. A hydrodynamic bearing device of claim 20, wherein the elastic member includes a first portion having a diameter slightly larger than the large diameter portion of the communicating hole, a second portion having a diameter slightly larger than the small diameter portion of the communicating hole and a tapered portion formed between the first and second portions, the elastic member seals the communicating hole with the whole portion of the elastic member being pushed into the tapered portion of the communicating hole.

* * * * *